United States Patent [19]
Williamson et al.

[11] Patent Number: 5,930,433
[45] Date of Patent: *Jul. 27, 1999

[54] WAVEGUIDE ARRAY DOCUMENT SCANNER

[75] Inventors: James B. Williamson, Sunnyvale; Gregory M. Cutler, Cupertino, both of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,935

[22] Filed: Jul. 23, 1997

[51] Int. Cl.⁶ ...................................................... G02B 6/06
[52] U.S. Cl. .......................... 385/116; 385/121; 385/119; 385/120; 365/234; 356/444
[58] Field of Search ...................................... 385/116, 115, 385/119, 120, 121; 356/444; 250/236, 227.32, 228; 365/234; 369/44.37, 44.38, 44.39, 109, 112; 359/217, 834

[56] References Cited

U.S. PATENT DOCUMENTS

| | | | |
|---|---|---|---|
| 4,005,926 | 2/1977 | Neale et al. | 356/444 X |
| 4,568,984 | 2/1986 | Juergensen et al. | 356/239 X |
| 5,155,790 | 10/1992 | Hwang | 385/121 |
| 5,235,183 | 8/1993 | Whiting et al. | 250/236 |
| 5,436,871 | 7/1995 | Russell | 365/234 |
| 5,716,556 | 2/1998 | Heard et al. | 264/1.24 |

FOREIGN PATENT DOCUMENTS

| | | |
|---|---|---|
| 0753958 A2 | 1/1997 | European Pat. Off. . |
| 9-116692 A2 | 5/1997 | Japan . |
| 9-269429 A2 | 10/1997 | Japan . |
| 9-281351 A2 | 10/1997 | Japan . |
| 9-284473 A2 | 10/1997 | Japan . |
| 7-301730 A2 | 11/1997 | Japan . |
| 9-298627 A2 | 11/1997 | Japan . |
| 8-321596 A2 | 12/1997 | Japan . |
| 8-321914 A2 | 12/1997 | Japan . |
| 9-329721 A2 | 12/1997 | Japan . |

*Primary Examiner*—Phan Palmer

[57] ABSTRACT

The optical scanner comprises a light source, an image sensor, a planar array of elongate optical waveguides, and input and output coupling optics for communicating light to and from the image transmission optics. The light source is adapted to direct light toward and reflect light from an object to be scanned. The planar array of elongate optical waveguides is formed in a substrate. Each of the waveguides include an input end and an output end and can be tapered along the length of the waveguide. The input optics disposed between the object and the waveguide array can include tubes, single lenses per waveguide, larger lenses per cluster of waveguides, a GRIN lens array or comparable mirror systems for directing light reflected from the object to be scanned to the input ends of the waveguides. The output optics disposed between the waveguide array and the image sensor can include lenses or mirror systems similar to that used for the input coupling optics.

20 Claims, 7 Drawing Sheets

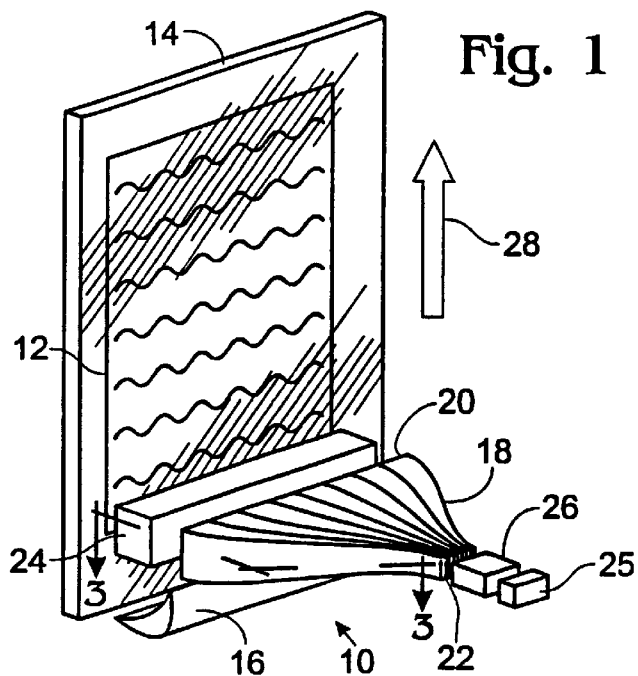

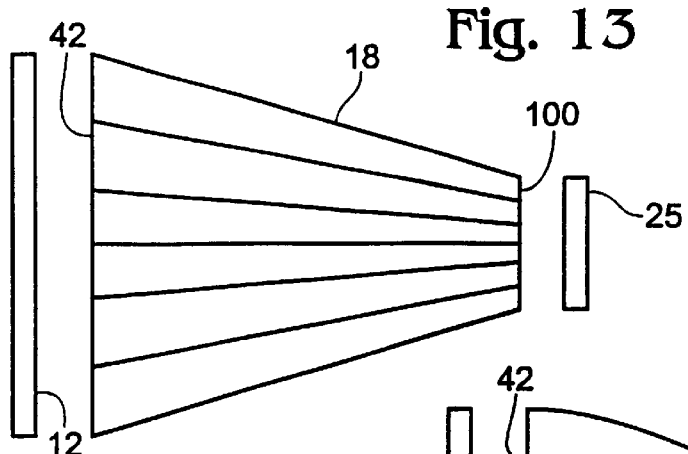
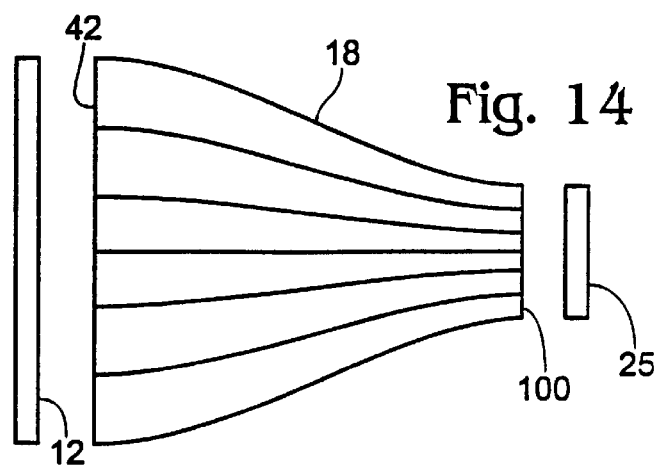
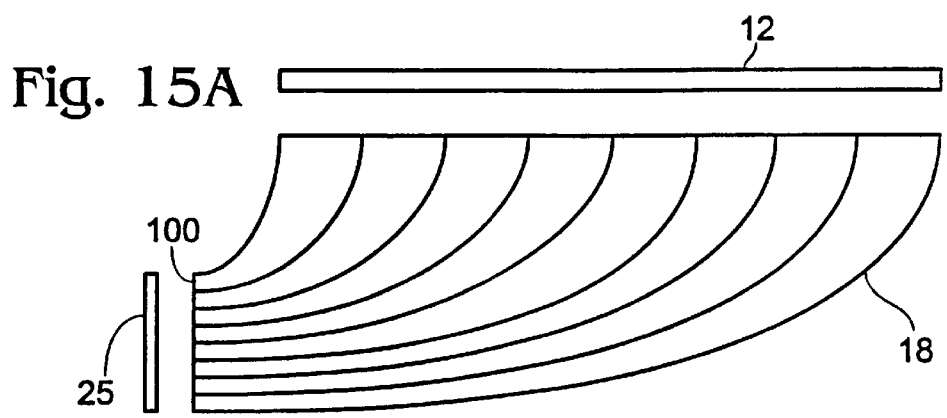
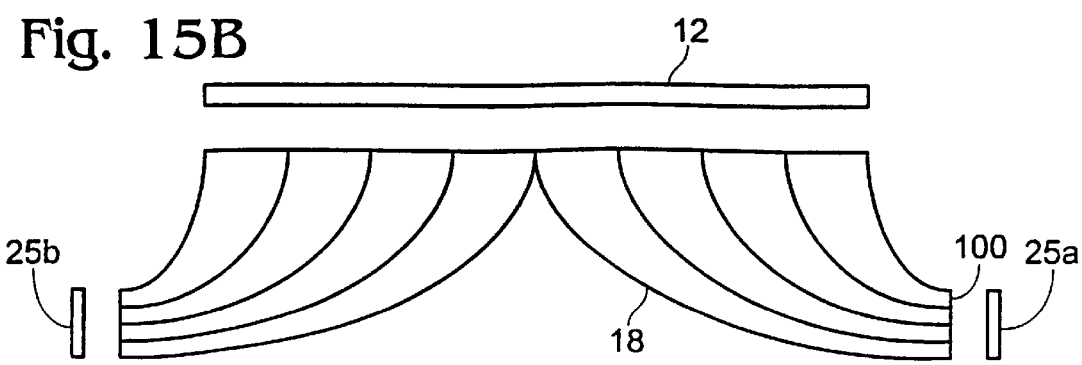

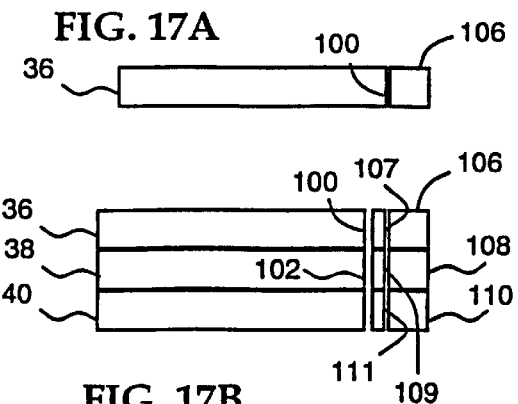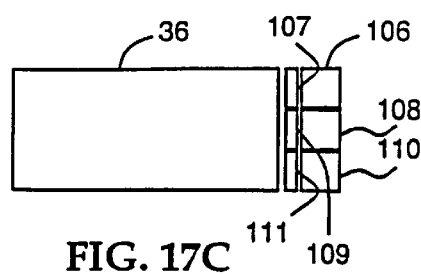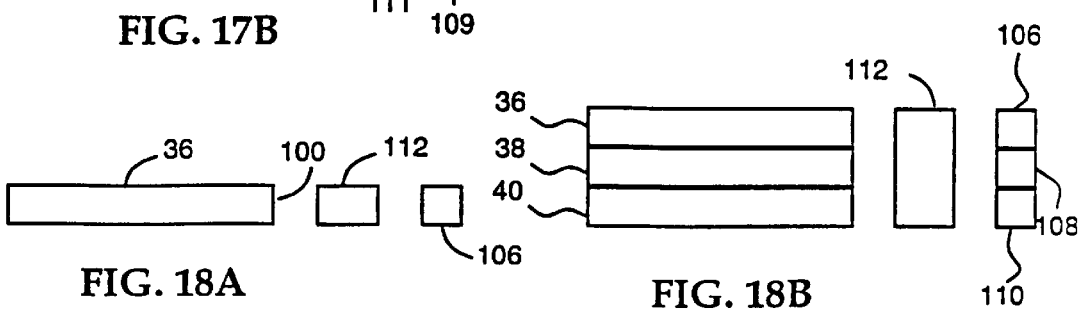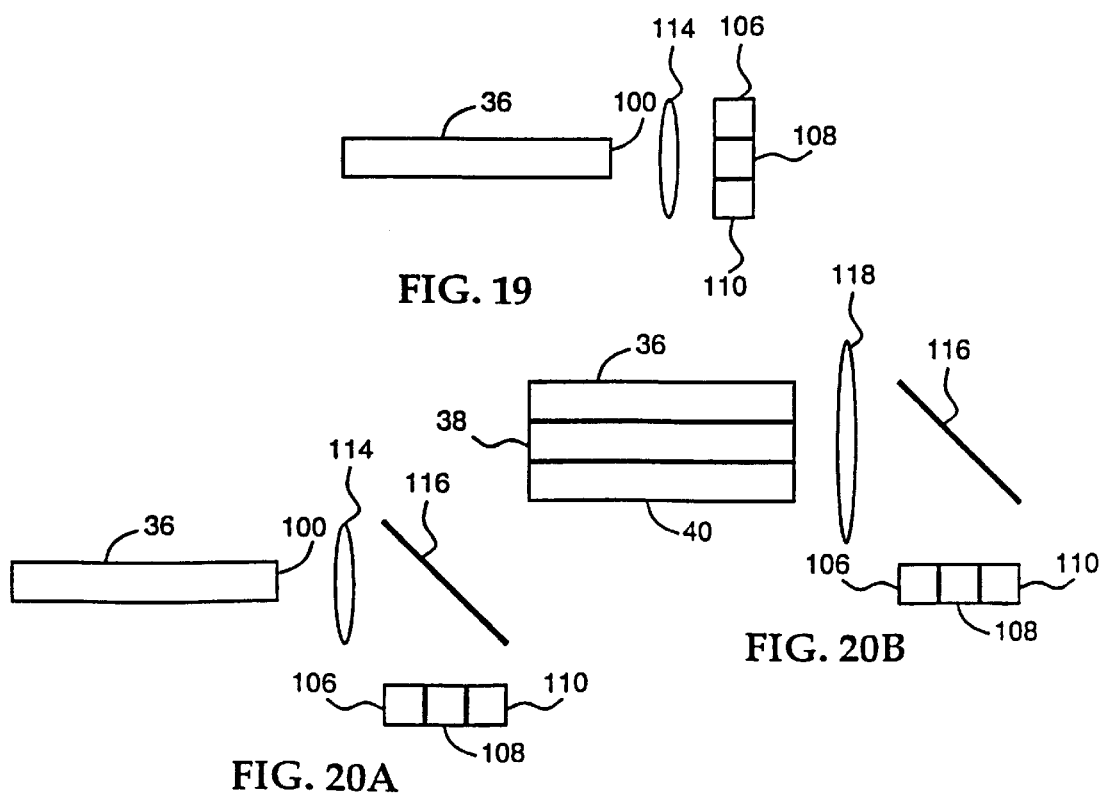

WAVEGUIDE ARRAY DOCUMENT SCANNER

BACKGROUND OF THE INVENTION

This invention relates generally to an electronic scanner or printer and more particularly to such a scanner or printer that employs a waveguide array.

Currently, document scanners, fax machines, and photocopiers use either reduction optics systems or contact image sensor (CIS) assemblies. Reduction optics systems essentially form an image of the area to be scanned on an image sensor, such as a charge coupled device (CCD), that is much smaller than the scanned line or area. In order to reduce the length of the scan head, mirrors are used to fold the optical path. In CIS assemblies, on the other hand, a long, page wide sensor is either placed in close proximity to the document or object to be scanned, or a relay lens, such as a gradient index (GRIN) lens array, is used to create a 1:1 image of the document on the image sensor.

These systems have important drawbacks. The problems with the reduction optics are their size, the cost of the mirrors and lenses, and the difficulty in aligning multiple mirrors. The problems with CIS systems are the high cost of the sensors, the difficulty in manufacturing butted 600 dpi detector arrays with no dropouts, and the limited depth of field and resolution available with lens arrays.

An alternative method for guiding light from individual pixels of the object to be scanned to respective image sensor pixels is through fiber optics. U.S. Pat. No. 4,760,421 to Margolin and U.S. Pat. No. 5,155,790 to Hwang illustrate several examples of scanners and printers known in the prior art that use fiber optic bundles. Though such devices address the problems associated with reduction optics, they are still difficult to manufacture.

U.S. Pat. No. 4,760,421 to Margolin discloses electronic scanners and printers that employ fiber optic bundles. The bundles are non-coherent in the sense that there is no predetermined relationship between the ends of the fibers in the first face of the bundle and the opposite ends of the fibers in a second face.

Another scanner or printer using a fiber optic bundle is disclosed in U.S. Pat. No. 5,155,790 to Hwang. The Hwang reference teaches a fiber optic bundle comprising ribbons of square fibers where the ribbons are set side by side at one end of the bundle and stacked at the other. Each square fiber of each ribbon comprises multiple rows and columns of (core) fibers each with a cladding to ensure maximal internal reflection of light.

Scanners and printers using fiber optic bundles have not been commercially successful in the marketplace because each fiber is an individual element that must be manipulated. When as many of 5000–10000 of such fibers are used to yield high quality images, the fiber optic bundle becomes quite unwieldy.

Accordingly, a need remains for a scanner or printer that addresses the problems of bulkiness, cost and complexity existent in prior art optical imaging and printing devices.

SUMMARY OF THE INVENTION

An optical scanner constructed according to the present invention comprises a light source, an image sensor, a planar array of elongate optical waveguides, and input and output coupling optics for communicating light to and from the image transmission optics. The light source is adapted to direct light toward an object to be scanned. The planar array of elongate optical waveguides is formed in a substrate. Each of the waveguides includes an input end and an output end and can be tapered along the length of the waveguide in any one of a variety of embodiments. The input coupling optics is preferably disposed between the object to be scanned and the waveguide array and can include tubes, single lenses per waveguide, larger lenses per cluster of waveguides, a GRIN lens array and comparable mirror systems for directing light reflected from the object to be scanned to the input ends of the waveguides. The output coupling optics is preferably disposed between the waveguide array and the image sensor and can include lenses or mirror systems similar to that used for the input coupling optics.

A primary advantage of such waveguide array-based scanner systems is that expensive optics such as used in reduction optics systems can be avoided. Additionally, such waveguide array-based scanners avoid the complexity of fiber optic-based systems.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a perspective view of an optical scanning unit constructed according to the present invention.

FIG. 2 is a sectioned plan view of the scanning unit of FIG. 1 taken along line 3—3 showing the arrangement of the input end of the light transmission means relative to the pixels of the object to be scanned.

FIG. 3 is a schematic sectioned plan view taken along line 3—3 showing the input coupling optics of the scanning unit of FIG. 1 according to a first embodiment of the invention.

FIG. 13 is a top plan view of a "fan-shaped" waveguide array.

FIG. 14 is a top plan view of a "candelabra-shaped" waveguide array.

FIG. 15A and 15B are a top plan views of respective "single candlestick" and "split-candlestick" type of waveguide array.

FIGS. 17A–17C, 18A–18B, 19, 20A–20B, 21A–21C, and 22A–22B are schematic top plan views showing various preferred types of output coupling optics of the scanning unit of FIG. 1 according to the invention.

DETAILED DESCRIPTION

Figure 4:
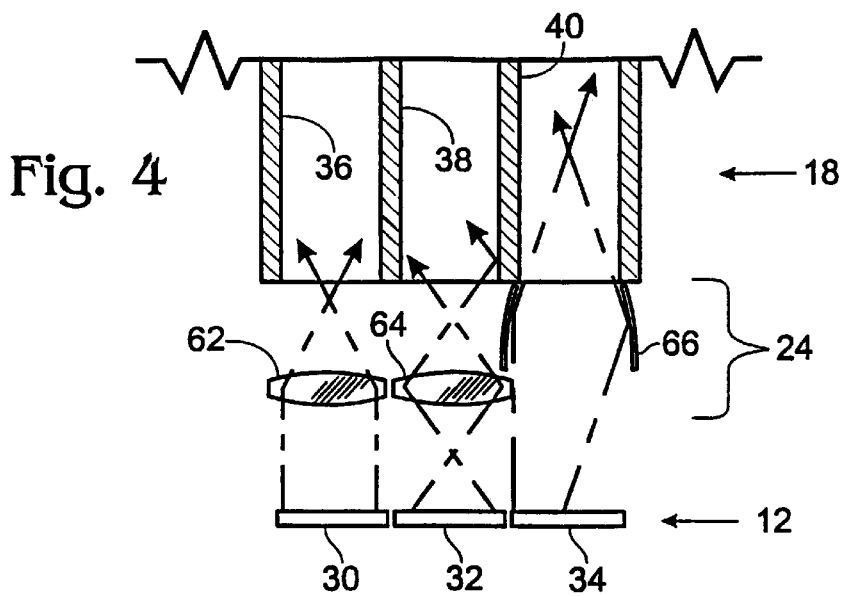
FIG. 4 is a schematic sectioned view taken along line 3—3 showing the input coupling optics of the scanning unit of FIG. 1 according to a second embodiment of the invention.

FIG. 1 shows an optical scanner 10 constructed according to the present invention. The scanner 10 is positioned proximate an object to be scanned, such as page 12, and a transparent platen 14. The scanner includes a light source 16 for directing light toward and reflecting light from an object to be scanned. The light source can be any known in the art, such as an LED, fluorescent or thermal source, that yields either broad-band "white" light, monochrome, or multiple narrow band illuminators representing a set of colors. The light source can be a set of discrete sources; however, most are extended linearly either by virtue of physical length or other optical means to illuminate a whole page or at least an elongate portion thereof The preferred sources for color scanning are an aperture fluorescent lamp and three or four color (red, green, blue and possibly yellow) LED arrays. Cold cathode fluorescent lamps are also preferred for use as a light source.

Light source 16 typically includes an intermediate optical structure (not shown) that directs the light to the area to be scanned. This takes the form of a lens or reflecting optical structure, that concentrates the light to the page.

The scanner constructed according to the present invention also includes a planar array of elongate optical waveguides 18 formed in a substrate. Each of the waveguides has an input end 20 and an output end 22. In a preferred embodiment of the invention, input optics 24 are disposed between the waveguide array 18 and the object to be scanned 12 to communicate light reflected from the object to the input end 20 of each of the waveguides. The system 10 further includes a photosensitive image sensor 25 such as a charge coupled device (CCD) array, the operation of which is well understood in the art. In the preferred embodiment of the present invention, output optics 26 are disposed between the waveguide array 18 and the image sensor 25 to communicate light transmitted from the output end 22 of each of the waveguides to the image sensor.

The scanner in FIG. 1 can be fixed as in a sheet-feed scanner where the object to be scanned is moved past the scanning optics. Alternatively, the scanner itself can move progressively along the length of the page as in flat-bed scanners. Thus, the scanner assembly 10 would start at one end of the platen 14 and move along the length of the object to be scanned, as in the direction of arrow 28, until the entire object 12 has been scanned.

The proposed embodiments of various input optics, waveguide arrays and output optics that can be used with the invention are described in more detail below.

Waveguide Array

The waveguide array is an array of individual waveguides, preferably in planar form, used to transport light from the document or object to be scanned to the image sensor, typically a CCD array. The waveguide array can be made by any number of known techniques. For example, arrays of optical fibers can be bound or bonded together in a PC board, polymers can be ablated, reactive ion etching can be used, the waveguides can be delineated photochemically, or the waveguide array can be created from a photopolymer using conventional lithography. Each of these methods result in the formation of the waveguide array onto or within (collectively referred to as "in") a planar substrate.

One such method is discussed in detail in U.S. Pat. No. 5,061,029 in which a waveguide array is formed by injection molding techniques. Typically, though, the material of the waveguide cores through which light is guided has a refractive index $n_2$ that is greater than the refractive index $n_1$ of the surrounding material. Thus, light incident on an input end of the waveguide is communicated via internal reflections within the waveguide core to an output end of the waveguide.

Because the pixel size for affordable conventional CCDs is much smaller than the pixel size of the scanned object, the light from a page-wide scan must be tapered to the width of the CCD array. While reduction optics are certainly capable of focusing the page-wide scan image onto a smaller CCD, the space and expense required for such a system is prohibitive. Accordingly, a simpler reduction optics method would be to use a tapered waveguide array. In essence, the bulky and complex optics can be replaced with relatively inexpensive plastic.

The waveguide array scanner also has application to the problems associated with a CIS page-width scan bar. Again, the tapered waveguide array is used to reduce the pagewide intensity distribution to a smaller size and a high resolution CCD receives the light from the waveguide output. The advantage over a CIS system is that higher resolution can be achieved without dropouts due to detector alignment. Also, in the case of a CIS assembly where a white light and three page wide detectors are used, the waveguide approach can be significantly less expensive.

Figure 10:
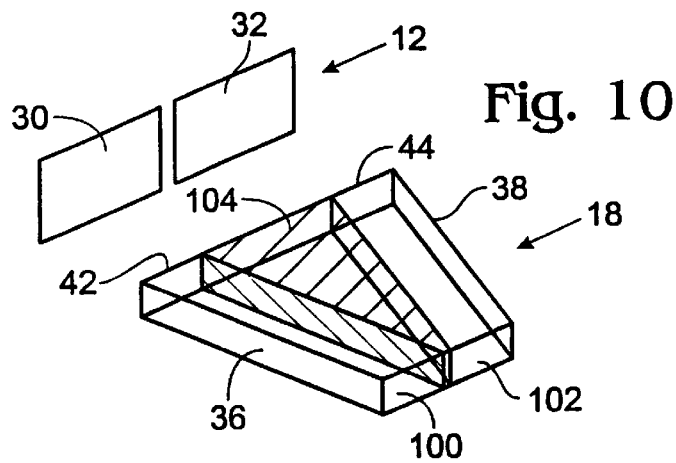
FIG. 10 is a perspective view of a tapering waveguide of a first type for use in the scanning unit of FIG. 1.
Figure 11:
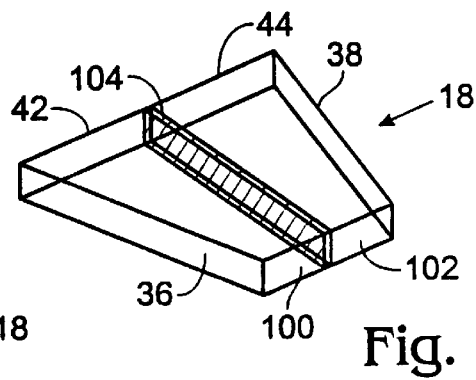
FIG. 11 is a perspective view of a tapering waveguide of a second type for use in the scanning unit of FIG. 1.

It is to be understood, however, that though the waveguide array as a whole tapers, it is not necessary that each individual waveguide must taper. In FIG. 10, for instance, the input ends 42,44 of waveguides 36,38 have the same dimension as the output ends 100,102. The taper of the waveguide as a whole occurs solely in the spacing material 104 of the substrate connecting the waveguides together. This type of taper can be used when the waveguide input ends are smaller than the pixel size of the object to be scanned such as when the input coupling optics shown in FIG. 6 (discussed below) are used. In the case where tapered waveguides are required, the waveguides would preferably be tapered at least in width in the direction of the plane of the waveguide substrate as shown in FIG. 11.

Figure 12:
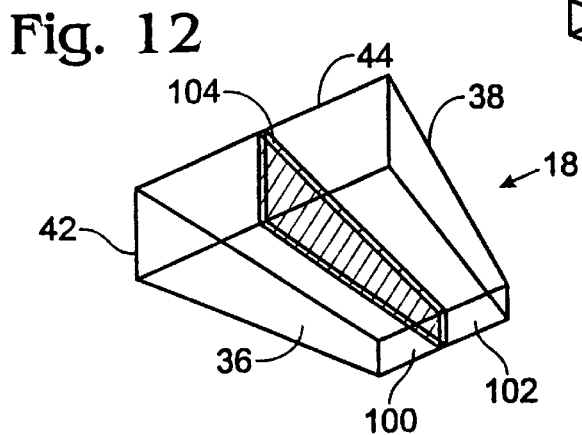
FIG. 12 is a perspective view of a tapering waveguide of a third type for use in the scanning unit of FIG. 1.

Preferably, however, the input ends of the individual waveguides would have dimensions that are approximately 1 object pixel wide by 1 object pixel high. A tapering of the waveguide only in the plane of the waveguide array would taper the width but not the height. Accordingly, it would be most preferred that the waveguide be tapered in height as well as width as shown in FIG. 12. The primary advantage of such tapering is improved resolution since light reflected from nonassociated pixels enters such waveguides at high angles of incidence that tend to be radiated out the sides of the waveguides and not passed to the associated image detector element. The effect of this tapering can be regulated by also underfilling the angle of each waveguide in the array as when the waveguides have an input end shorter than the pixel height of the object to be scanned. These are subsequently referred to as "thin" waveguides.

The general shape of the tapered array of optical waveguides can take several forms according to the invention. A primary design concern is to minimize the volume required by the waveguide array in the scanning system. FIG. 13 illustrates a "fan-shaped" taper in which the taper from input end 42 of the waveguide array to output end 100 is linear. This type of taper is most preferably used with the tube arrangement shown in FIG. 3.

FIG. 14 illustrates a "candelabra-shaped" taper that is distinguished by a gradually increasing, curving taper portion from the input end 42 of waveguide array 18 to a midportion thereof, and then a gradually decreasing, curving taper portion from the midportion to the output end 100 of the waveguide array. More simply, the candelabra-shaped taper has a minimum taper change at the input and output end of the waveguide array and a maximum taper change at the midpoint. This arrangement can be split to direct light to multiple image sensors similar to that shown in FIG. 15B or folded to direct light to a two-dimensional sensor as shown in FIG. 16.

FIGS. 15A and 15B respectively illustrate a "single candlestick" and "split-candlestick" taper that are adapted to direct light to an image sensor that is not paraparallel to the object 12 plane. In the "split-candlestick" arrangement shown in FIG. 15B, for example, light transmitted from the output end 100 of the waveguide array is communicated to one of two separated image sensors 25a,25b in opposing relationship to one another. The candlestick arrangements shown and described are highly preferred as providing an extremely small form factor, thus reducing the total size of the scanning device in which it is used.

Figure 16:
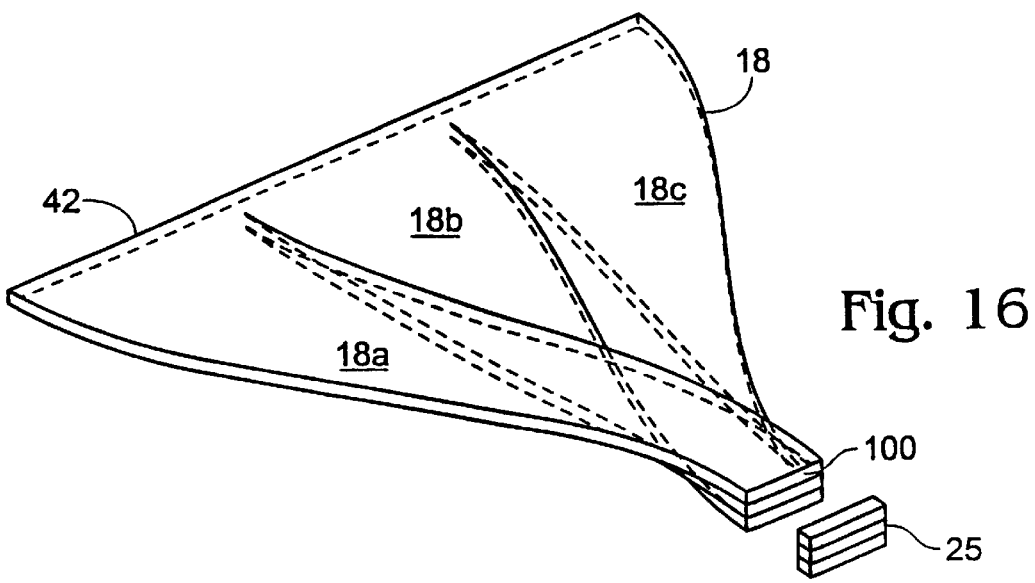
FIG. 16 is a top plan view of a "split and folded" waveguide array.

FIG. 16 illustrates an "interleaved" taper in which the waveguide array includes linearly aligned input ends 42 and output ends 100 stacked in registry with a two dimensional image sensor 25. As illustrated, waveguide array 18 is split into plural clusters, such as clusters 18a, 18b and 18c, that are stacked on top of one another at an output end of the array in alignment with the sensor rows of image sensor 25.

The foregoing waveguide array shapes is only meant to be exemplary and is not intended to limit the tapering embodiments that can be used with the present invention to those described above. It is understood that the waveguide array acts essentially as a light conduit that can take a variety of different shapes and that the CCD can be placed anywhere as deemed appropriate by the system designer.

Input Coupling Optics

FIG. 2 illustrates a method of coupling light reflected from picture elements or pixels 30, 32 and 34 of the object 12 to associated waveguides 36, 38 and 40 wherein the waveguides are pointed directly at the associated pixel. These picture elements or pixels of the object to be scanned ("object pixels") are notional elements and do not correspond to any predetermined area of the object 12. Instead, the object 12 can be thought of as having a continuous image that is artifically subdivided into separate picture elements according to the so-called "resolution" of the scanner.

This method has several disadvantages, however. The flux intensity of light reflected from the object 12 and received by the waveguides is reduced depending upon the distance D at which the waveguides 36, 38 and 40 (and respective input ends 42, 44 and 46) are located from the pixel. Therefore, this method is useful only when the waveguide is either very close to the imaged object (as could be done in a CIS configuration) or where there is so much light that it does not matter that there is a great deal of loss of illumination intensity. Another concern with this method is that, even where the waveguide input end is close to the emitting object, the individual waveguide's "field of view" (such as shown by the phantom dashed lines) receives light from adjacent pixels depending upon the numerical aperture of the waveguide.

FIG. 3 illustrates a first type of input coupling optics for use with the scanner of FIG. 1 in which tubes, such as tubes 48, 50 and 52, are arrayed proximate associated waveguides 36, 38 and 40. Each of the tubes includes a light-transmitting bore therethrough coupling input and output ends of the tube, such as input end 54 and output end 56 of tube 48. The tubes are preferably axially aligned with, and of substantially the same cross-sectional dimension as, the input end of respective waveguides. The tubes are capable of selectively passing an angularly dependent portion of light incident on the input end of the tube to an output end and thus act to limit the field of view of the waveguides.

Two methods in particular are contemplated which can limit the field of view of the waveguides. First, if the tube is made absorbing, then only that light subtended by the input and output ends of the tube is allowed into the waveguide. If the walls are made of a polished black plastic, then the reflectivity of the walls follows standard fresnel laws. That is, the reflectivity is high for grazing angles of incidence and rapidly decreases for smaller angles of incidence. If the wall is a reflector, then the angular dependence also drops with increasing angle, but this time due to the fact that higher angles will reflect more times within the tube walls and therefore decay due to a non-perfect reflectivity (<1).

This effect is shown in FIG. 3, where light ray 58 reflected from or transmitted through (as in a backlit arrangement) pixel 30 strikes the walls of tube 48 only once before it is reflected into waveguide 36. Light ray 60, from adjacent pixel 32, enters the input end 54 of tube 48 at a high angle of incidence and internally reflects from the interior walls of tube 48 several times before entering the waveguide 36. Because the reflectance of the tube walls is non-perfect, the total light intensity that enters waveguide 36 is biased toward those light rays emitted/reflected from pixel 30 that require fewer internal reflections. Note that, had the walls of tube 48 been formed of black plastic, it is very likely that light ray 60 would have been absorbed while light ray 58 would have been reflected into the waveguide.

FIG. 4 illustrates a second type of input coupling optics in which a single lens is used for each waveguide, such as lenses 62,64 for respective waveguides 36,38. Alternatively, a reflective collector can be used for each waveguide, such as collector 66 for waveguide 40. Unless otherwise noted (as in the split lens system described in FIG. 7), each of these lenses and reflective collectors or mirrors has a three-dimensional structure that is adapted to alter both the planar and transverse vector components of the light rays. Although shown as two dimensional structures for clarity and simplicity, it is to be understood that such lenses, collectors and mirrors guide light in three dimensions.

The width of the lenses is preferably equal to the array pitch of the waveguides. If the lenses are disposed in close proximity to the pixels in order to collect more light, then the image at the waveguide is larger than the waveguide input end. This causes image overlap between adjacent waveguides, which is clearly not a desirable effect. If the lens is positioned midway between the object to be scanned and the array of waveguides, then a 1:1 imaging can occur. This is shown in FIG. 4 where light rays are shown as dashed-dotted lines. To further limit image overlap, the tube structure shown in FIG. 3 can be used in conjunction with the lenses of FIG. 4. Finally, if the lenses are positioned closer to the waveguide than to the pixels of the object to be scanned, the light collection would decrease. However, a smaller waveguide could be used and the loss from tapering the waveguide (discussed below with reference to FIG. 6) could be avoided. Additionally, the increased space between adjacent waveguides would limit optical crosstalk from adjacent pixels.

Figure 5:
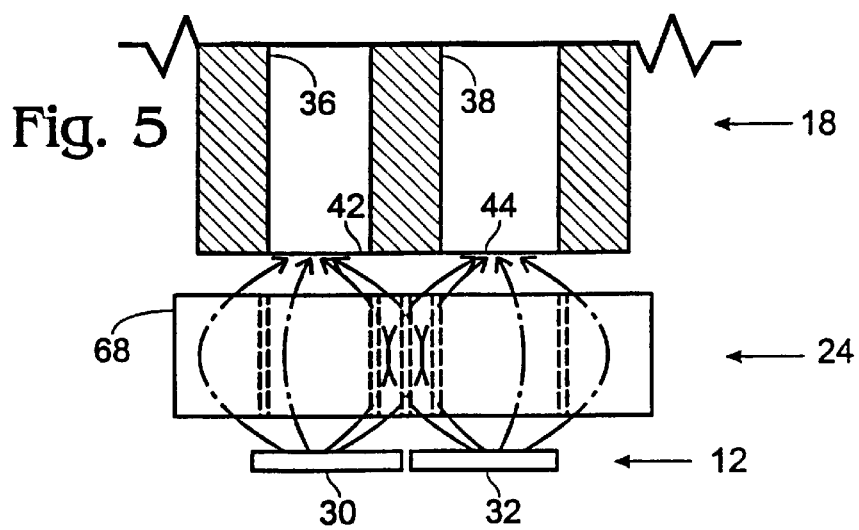
FIG. 5 is a schematic sectioned view taken along line 3—3 showing the input coupling optics of the scanning unit of FIG. 1 according to a third embodiment of the invention.

FIG. 5 illustrates a third type of input coupling optics in which a gradient index lens array 68 is used to communicate light from pixels 30,32 to associated waveguide input ends 42,44. One manufacturer, Nippon Sheet Glass Company, Ltd., produces these lens arrays under the trade name "SELFOC," a registered trademark in Japan. These lens arrays are generally described in U.S. Pat. No. 5,568,320 and in an article entitled "Office Application of Gradient-Index Optics," by James D. Rees, published in SPIE, Vol. 935, Gradient-Index Optics and Miniature Optics, in 1988. In summary, a gradient index lens array usually comprises an array of light conducting and imaging fibers or rods possessing a refractive index distribution across their cross-sections that varies parabolicly in an outward direction from their center axes. These changing refractive indices are illustrated in FIG. 5 by the areas divided by the double-dashed lines and the path through these areas taken by light rays from pixels 30,32 and shown by dashed-dotted lines.

Figure 6:
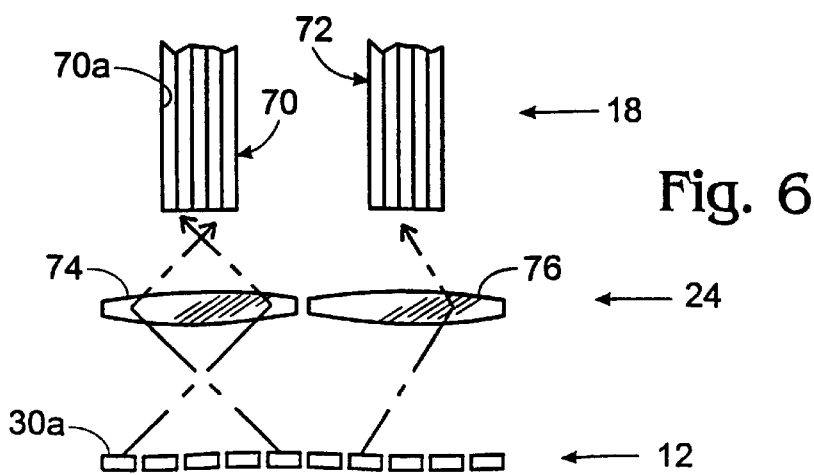
FIG. 6 is a schematic sectioned view taken along line 3—3 showing the input coupling optics of the scanning unit of FIG. 1 according to a fourth embodiment of the invention.

FIG. 6 illustrates a fourth type of input coupling optics using clusters of waveguides, such as clusters 70,72 that are associated with respective macro lenses 74,76. As shown, each of the waveguide clusters includes five waveguides but is understood that any number of waveguides can be included within each cluster. The waveguides are paired with a respective pixel so that, for instance, the light from pixel 30a is communicated through macro lens 74 to waveguide 70a. Use of this type of input coupling optics allows the individual waveguides to be made smaller than a pixel width, thereby requiring less taper and consequently less taper loss when guiding light to the output end of the waveguide array.

Figure 7:
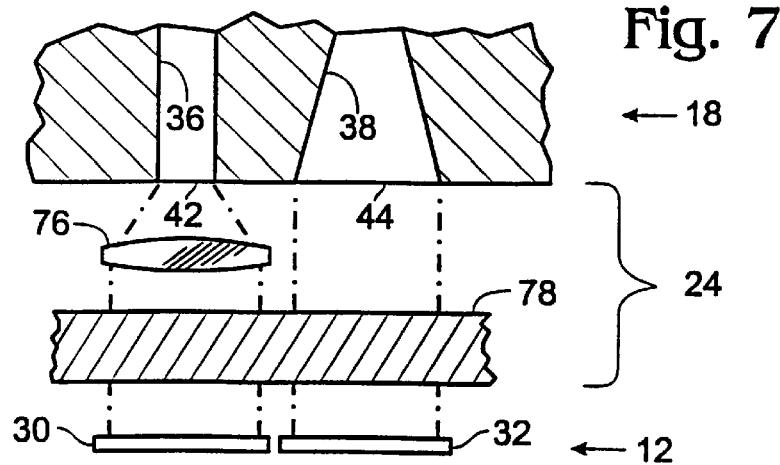
FIG. 7 is a schematic sectioned view taken along line 3—3 showing the input coupling optics of the scanning unit of FIG. 1 according to a fifth embodiment of the invention.

FIG. 7 illustrates a fifth type of input coupling optics that uses a "split" lens system. Light in the plane of the waveguide array substrate is guided into a respective waveguide by a first set of input coupling optics while light transverse to this plane is guided by a second set of input coupling optics. The first set of coupling optics comprises a collector in the plane of the waveguide array substrate, such as planar lens 76, that deflects into waveguide 30 light that is traveling in the plane of the substrate and reflected from pixel 30. The second set of coupling optics comprises a separate collector, such as cylindrically symmetric lens 78 (shown orthogonally in cross-section in FIG. 7), that deflects into waveguide 30 light that is traveling transverse to the plane of the waveguide array substrate. A planar compound parabolic concentrator (CPC) could also be used in place of the lens 76. In these geometries, the input end 42 of waveguide 36 would be smaller than the pixel 30 width. Preferably, the cylindrical lens 78 is used in conjunction with either planar lens 76 or a tapered waveguide 38 as described above.

In an alternative embodiment, the waveguide 38 could be of a tapered type having an input end 44 with a width approximately equal to the width of pixel 32. In this case, it would not be necessary to include collector 76 in the plane of the substrate. Rather, only a collector 78 of transversely directed light would be required. Note, in some of these cases, either a metallized reflector or a total internal reflection lens system could be used.

Figure 8:
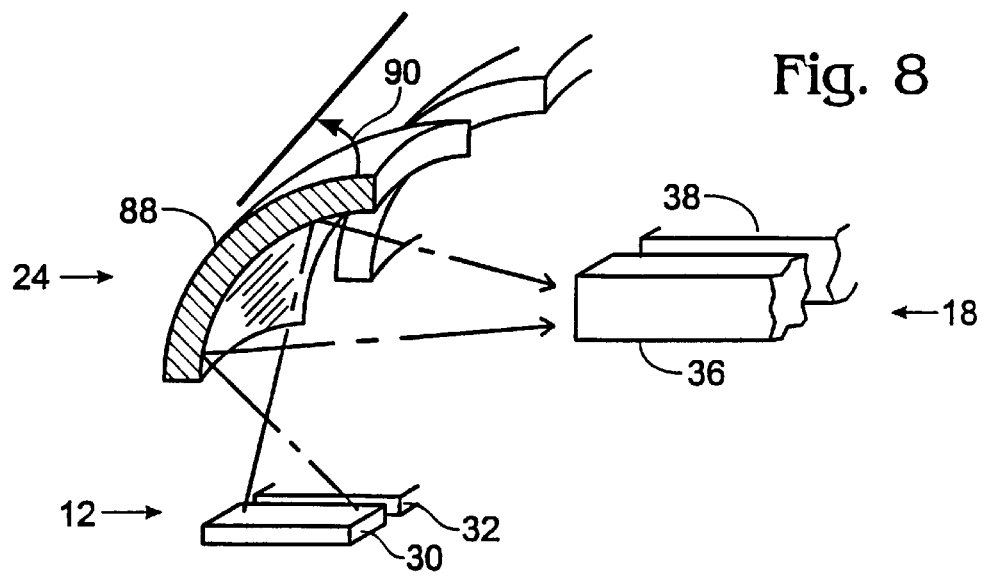
FIG. 8 is a perspective view showing the input coupling optics of the scanning unit of FIG. 1 according to a sixth embodiment of the invention.
Figure 9:
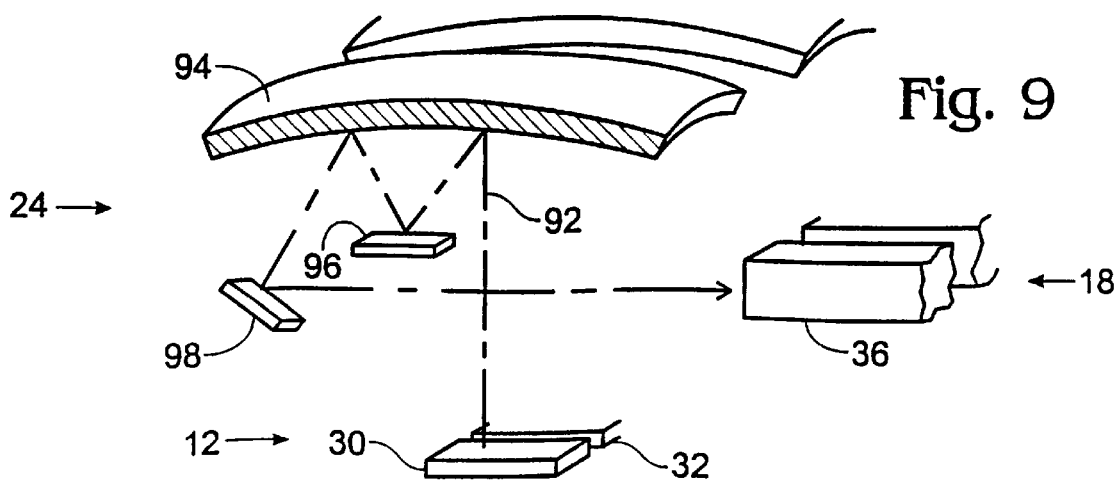
FIG. 9 is a perspective view showing the input coupling optics of the scanning unit of FIG. 1 according to a seventh embodiment of the invention.

FIGS. 8 and 9 illustrate input coupling optics using mirror systems. An individual mirror per waveguide can be used to yield a system equivalent to that shown in FIG. 4. Alternatively, mirrors and waveguide clusters can be used to yield a system similar to FIG. 6. In the system shown in FIG. 8, a concave mirror 88 tilted at an angle 90 of approximately forty-five degrees relative to the image plane of pixels 30,32 could be used to focus the light rays from pixels (shown as dashed-dotted lines) to respective waveguides 36,38. An alternative Offner Catoptric System is shown in FIG. 9 in which light 92 from pixel 30 is reflected from a primary curved mirror 94 to secondary flat mirrors 96,98 and thence to waveguide 36.

Output Coupling Optics

The output coupling geometries are similar in design to the input coupling geometries described above. However, where the waveguides are coupled to pixels of the image sensing CCD or other device in a 1:1 fashion, the output ends of each of the individual waveguides should be made to be of approximately the same width as the pixels of the CCD. Several output coupling optics arrangements are envisioned for use with the present invention.

FIG. 17A, 17B and 17C show the embodiment where the CCD array is simply butted to the waveguide. FIG. 17A illustrates an individual waveguide 36 proximate an individual pixel 106 of the image sensor with no intervening output coupling optics. This is useful for sequential color scanning or monochrome. FIG. 17B illustrates three such waveguides 36, 38 and 40 proximate respective pixel sensor elements 106, 108 and 110, whereby each sensor element 106, 108 and 110 includes a respective color (red, green or blue) filter 107, 109, and 111 associated with it. The output ends 100,102 of waveguides 36,38 are approximately equal in size (and spacing) as the pixel sensor elements 106,108. For non-strobed white illumination, a three layer butted geometry could be used. FIG. 17C illustrates an alternative embodiment where waveguide 36 is three pixel sensor elements in height, whereby each CCD element 106, 108 and 110 includes a respective color filter 107, 109, and 111 associated with them as with FIG. 17B. The arrangement of FIG. 17C eliminates the problems in sequential scanning (such as how to scan fluorescent materials) but at a loss of signal since there is no color separation, just color subtraction at each CCD element.

FIGS. 18A and 18B illustrate a first type of output coupling optic that utilizes a gradient index (GRIN) lens array 112 to perform 1:1 imaging of the waveguide elements to the image sensor, such as waveguide 36 to CCD pixel element 106 in FIG. 18A. This again is useful for non-sequential scanning. If simultaneous color scanning is desired, then a larger GRIN lens array 112 as in FIG. 18B or three stacked GRIN lens arrays could image three layered waveguides 36, 38 and 40 onto three stacked CCD pixels elements 106, 108 and 110.

FIG. 19 illustrates a second type of output coupling optic in which the light path from each thin waveguide 36 of the array of waveguides is communicated through lens 114 to three color CCD pixel elements 106, 108 and 110.

FIG. 20A and 20B illustrates a third type of output coupling optics using a trichroic filter 116 that separates light from each waveguide into three color components and directs each component to separate CCD pixel elements 106, 108 and 110. For each waveguide of the array as shown in FIG. 20A, light from the waveguide 36 is communicated through a respective lens 114 to a beam splitter or grating filter 116 that decomposes the light from waveguide 36 into respective red, blue and green color components. These light components are reflected along slightly different paths to pixel sensor elements 106, 108 and 110. Similarly, FIG. 20B shows an embodiment where light from three waveguides 36, 38 and 40 is directed through a large lens 118 to trichroic filter 116 that decomposes the light from the waveguides and directs them to pixel elements 106, 108 and 110.

Figure 21A:
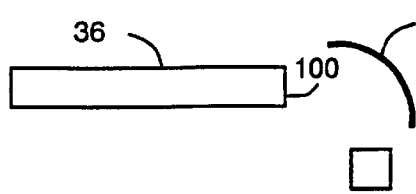
Figure 21B:
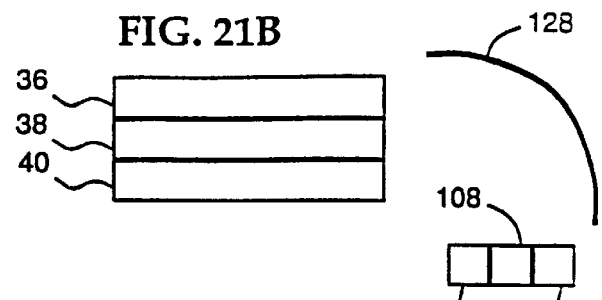
Figure 21C:
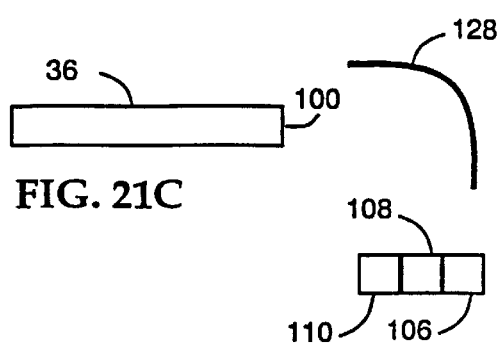

FIGS. 21A, 21B and 21C illustrate a fourth embodiment of output coupling optics using curved mirrors 128 whose shape is adapted to project light from a waveguide 36 (or several waveguides 36, 38 and 40) to pixel sensor element 106 (or elements 106, 108 and 110). The curvature of mirror 128 in FIG. 21C, for instance, acts to spread rather than focus light from a single waveguide 36 to multiple pixels sensor elements 106, 108 and 110. Mirror 128 is angled relative to the plane of the waveguide substrate so that the light from the waveguide can be directed to an image sensor mounted transverse to the waveguide substrate plane.

Figure 22A:
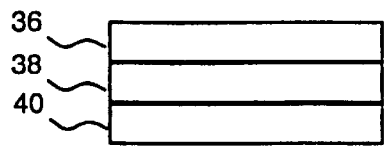
Figure 22B:
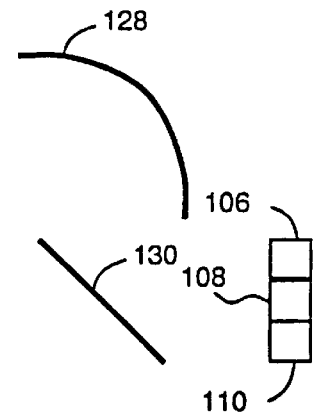

FIGS. 22A and 22B are similar to the FIG. 21 embodiments except for the addition of a reflecting planar mirror 130 mounted at a forty-five degree angle relative to the plane of the waveguide substrate to direct light parallel to the plane of the waveguide substrate. In FIG. 22A, for instance, light from waveguides 36, 38 and 40 are reflected from curved mirror 128 and directed downward toward planar mirror 130, which then reflects light toward respective pixel sensor elements 106, 108 and 110.

Having described and illustrated the principles of the invention in a preferred embodiment thereof, it should be apparent that the invention can be modified in arrangement and detail without departing from such principles. We claim all modifications and variation coming within the scope of the following claims.

We claim:

1. An optical scanner comprising:
   a light source for directing light toward an object to be scanned;
   a planar array of elongate optical waveguides formed in a substrate, each of said waveguides having an input end and an output end;
   input optic means for communicating light reflected from said object to the input end of each of said waveguides;
   a photosensitive image sensor; and
   output optic means for communicating light transmitted from the output end of each of said waveguides to the image sensor.

2. The optical scanner according to claim 1, wherein said input optic means include an array of lenses, each one of said lenses being associated with an associated one of said waveguides.

3. The optical scanner according to claim 2, wherein said array of lenses is disposed midway between the object to be scanned and the array of waveguides.

4. The optical scanner according to claim 1, wherein each of said waveguides are tapered in width from said input end to said output end.

5. The optical scanner according to claim 4, wherein each of said waveguides are tapered in height from said input end to said output end.

6. The optical scanner according to claim 1, wherein said input optic means include a plurality of lenses, wherein each lens is associated with a waveguide cluster formed of a plurality of waveguides.

7. The optical scanner according to claim 1, further including a optical collector integral with said array of waveguides and disposed in the plane of the waveguide substrate, and an external collector adapted to collect light for the plane perpendicular to the waveguide substrate.

8. The optical scanner according to claim 1, wherein said input optic means include an array of tubes capable of passing an angularly dependent portion of light incident on an input end therethrough to an output end, each of said tubes including a light-transmitting bore therethrough having an output end disposed proximate to, axially aligned with and of substantially the same cross-sectional dimension as an input end of a respective waveguide.

9. The optical scanner according to claim 1, wherein said input optic means include a gradient index lens array.

10. The optical scanner according to claim 1, wherein said array of waveguides is fan-shaped.

11. The optical scanner according to claim 1, wherein said array of waveguides is candelabra-shaped.

12. The optical scanner according to claim 1, wherein said array of waveguides is candlestick-shaped.

13. The optical scanner according to claim 1, further including a second photosensitive image sensor, wherein the light transmitted from the output end of each of said waveguides is communicated to one of either of said photosensitive image sensor or said second photosensitive image sensor.

14. The optical scanner according to claim 1, wherein said photosensitive image sensor comprises a two-dimensional sensor array having a plurality of sensor rows, said array of waveguides having input ends linearly aligned and output ends stacked in registry with said sensor rows.

15. The optical scanner according to claim 1, wherein said output optic means include a gradient index lens array.

16. The optical scanner according to claim 1, wherein said output optic means includes a lens associated with each waveguide for communicating light to three elements of the photosensitive image sensor.

17. The optical scanner according to claim 1, wherein said output optic means includes a trichroic filter adapted to separate light transmitted from the output of each waveguide into a plurality of different frequencies.

18. An optical scanner comprising:
   a light source for directing light toward an object to be scanned;
   a planar array of elongate optical waveguides formed in a substrate, each of said waveguides having an input end and an output end;
   input optic means for communicating light reflected from said object to the input end of each of said waveguides; and
   a photosensitive image sensor proximate to the output end of each of said waveguides.

19. The optical scanner according to claim 18, wherein the photosensitive image sensor is comprised of an array of CCD elements, each of said elements corresponding to an individual pixel of an image, wherein each of said CCD elements is proximate an associated waveguide output end.

20. An optical scanner comprising:
   a light source for directing light toward an object to be scanned;
   a planar array of elongate optical waveguides formed in a substrate, each of said waveguides having an input end, said input end being adapted to receive light reflected from the object to be scanned, and an output end;
   a photosensitive image sensor; and
   output optic means for communicating light transmitted from the output end of each of said waveguides to the image sensor.

* * * * *